(12) United States Patent
Cetin et al.

(10) Patent No.: US 7,839,314 B2
(45) Date of Patent: Nov. 23, 2010

(54) SATELLITE RADIO NAVIGATION RECEIVER

(75) Inventors: Ediz Cetin, London (GB); Izzet Kale, Mitcham (GB); Richard Charles Spicer Morling, London (GB); Andrew Graham Dempster, Coogee (AU)

(73) Assignee: University of Westminster (GB)

( * ) Notice: Subject to any disclaimer, the term of this patent is extended or adjusted under 35 U.S.C. 154(b) by 5 days.

(21) Appl. No.: 12/224,062

(22) PCT Filed: Feb. 14, 2007

(86) PCT No.: PCT/GB2007/000515

§ 371 (c)(1),
(2), (4) Date: Oct. 9, 2008

(87) PCT Pub. No.: WO2007/093790

PCT Pub. Date: Aug. 23, 2007

(65) Prior Publication Data

US 2009/0058705 A1    Mar. 5, 2009

(30) Foreign Application Priority Data

Feb. 15, 2006    (GB) ................................ 0603038.1

(51) Int. Cl.
*H03M 1/10* (2006.01)
(52) U.S. Cl. ........................ 341/120; 341/118; 341/155; 341/173; 341/174; 375/130; 375/131; 375/135; 375/148; 375/261; 455/318; 342/361; 342/362
(58) Field of Classification Search ................ 342/361, 342/362; 455/318; 375/261, 473, 130, 131, 375/135, 148; 341/118, 120
See application file for complete search history.

(56) References Cited

U.S. PATENT DOCUMENTS

| | | | | |
|---|---|---|---|---|
| 5,268,927 A * | 12/1993 | Dimos et al. | ................ | 375/147 |
| 5,495,203 A * | 2/1996 | Harp et al. | ................ | 329/306 |
| 5,872,540 A * | 2/1999 | Casabona et al. | ........... | 342/362 |
| 6,483,867 B1 * | 11/2002 | Mannermaa | ................ | 375/149 |
| 6,940,916 B1 * | 9/2005 | Warner et al. | ............... | 375/261 |
| 6,985,523 B2 * | 1/2006 | Sims et al. | ................ | 375/232 |
| 7,061,994 B2 * | 6/2006 | Li et al. | ..................... | 375/316 |

(Continued)

OTHER PUBLICATIONS

Cetin et al.; "*Efficient FPGA Implementation of an Adaptive IQ-Imbalance Corrector for Communication Receivers Using Reduced Range Multipliers*"; University of Westminster; Sep. 2005; pp. 1-4.

(Continued)

*Primary Examiner*—Linh V Nguyen
(74) *Attorney, Agent, or Firm*—Ohlandt, Greeley, Ruggiero & Perle, LLP

(57) ABSTRACT

In a satellite radio navigation receiver receiving a transmitted radio navigation signal, a method of removing I/Q-mismatches in the received signal, comprising: resolving the received signal into I and Q signal component, and providing them as inputs to a demixing stage which removes unwanted signals, the demixing stage including first and second cross-coupled adaptive filters, whose coefficients are updated by the outputs of the demixing stage, the outputs of the demixing stage representing an IQ mismatch corrected signal. The coefficients are updated only by the polarity values of the outputs, resulting in great simplification. The receiver may be a zero-IF or low-IF receiver, and may operate on time domain or frequency domain signals.

7 Claims, 5 Drawing Sheets

Proposed Frequency-domain Configuration

U.S. PATENT DOCUMENTS

| | | | |
|---|---|---|---|
| 7,120,198 B1 * | 10/2006 | Dafesh et al. | 375/261 |
| 7,142,616 B2 * | 11/2006 | Ouchi et al. | 375/316 |
| 7,580,482 B2 * | 8/2009 | Endres et al. | 375/326 |
| 7,653,164 B2 * | 1/2010 | Lin et al. | 375/350 |
| 2003/0123534 A1 * | 7/2003 | Tsui et al. | 375/229 |
| 2003/0206603 A1 | 11/2003 | Husted | 375/324 |
| 2005/0012664 A1 * | 1/2005 | Gerein | 342/361 |
| 2005/0089123 A1 | 4/2005 | Spiegel | 375/345 |
| 2005/0180532 A1 | 8/2005 | Lee et al. | 375/346 |
| 2006/0291590 A1 * | 12/2006 | Elahi et al. | 375/332 |
| 2007/0066268 A1 * | 3/2007 | Simic et al. | 455/318 |
| 2007/0080835 A1 * | 4/2007 | Maeda et al. | 341/120 |
| 2007/0092260 A1 * | 4/2007 | Bontu et al. | 398/152 |

OTHER PUBLICATIONS

Cetin et al.; *"Adaptive Compensation of Analog Front-end I/Q Mismatches in Digital Receivers"*; University of Westminster; ISCAS 2001; pp. 370-373.

Cetin et al.; *"On the Structure, Convergence and Performance of an Adaptive I/Q Mismatch Corrector"*; University of Westminster; 2002; pp. 2288-2292.

Cetin et al.; *"On various Low-Hardward-Complexity LMS Algorithms for Adaptive I/Q Correction in Quadrature Receivers"*; University of Westminster; 2004; pp. 461-464.

* cited by examiner

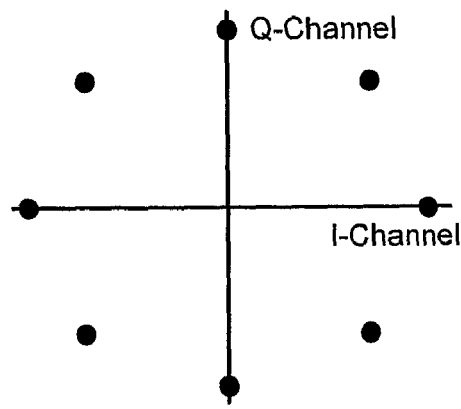
Figure 1: AltBOC Constellation Diagram
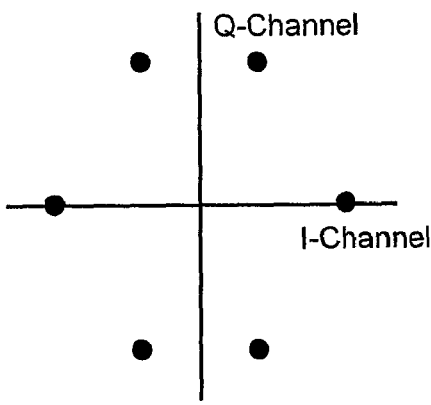
Figure 2 Hexaphase Constellation Diagram
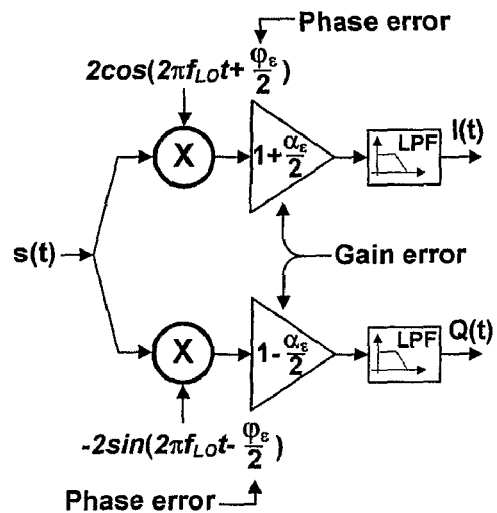
Figure 3: Prior Art :- Quadrature Demodulator

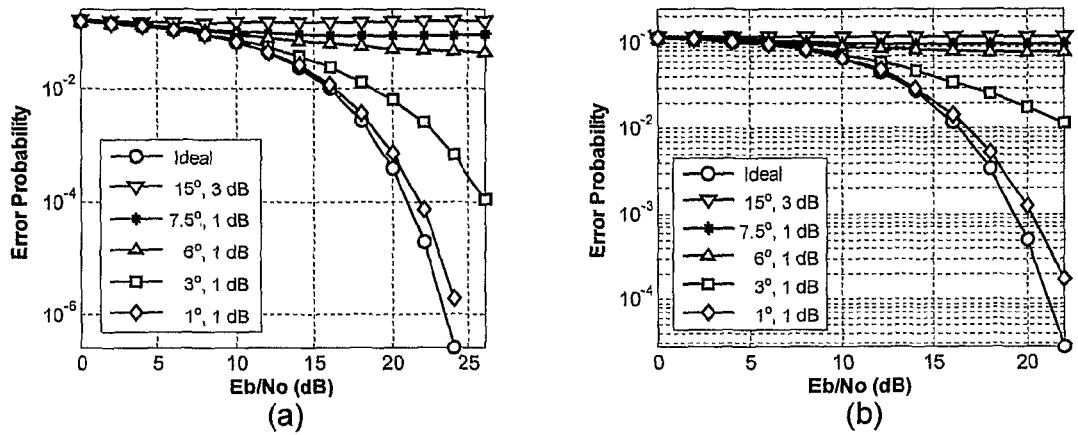
Figure 4 The effects of IQ-imbalances on BER of (a) 32-PSK and (b) 256-QAM modulated signals.
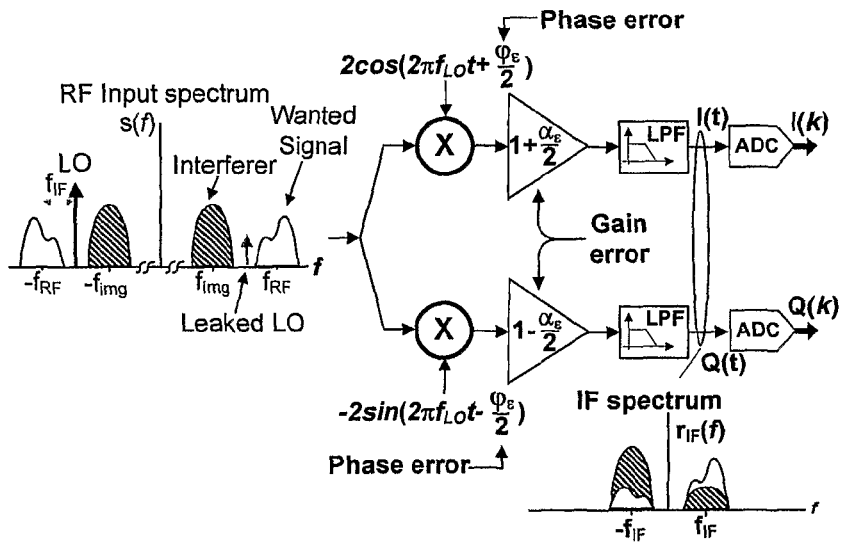
Figure 5 (a) Low-IF ($f_{LO}=f_{RF}-f_{IF}$) configuration

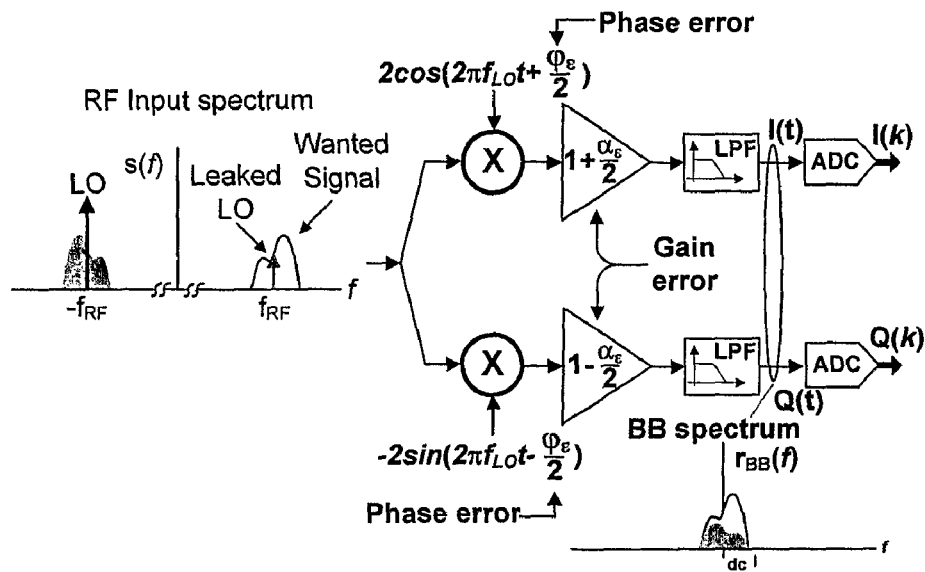
Figure 5 (b) Zero-IF ($f_{LO}=f_{RF}$) configuration.
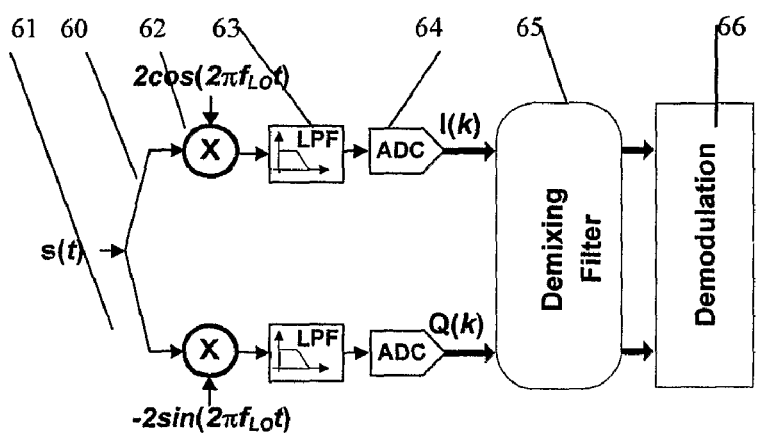
Figure 6(a) Proposed Time-domain Configuration

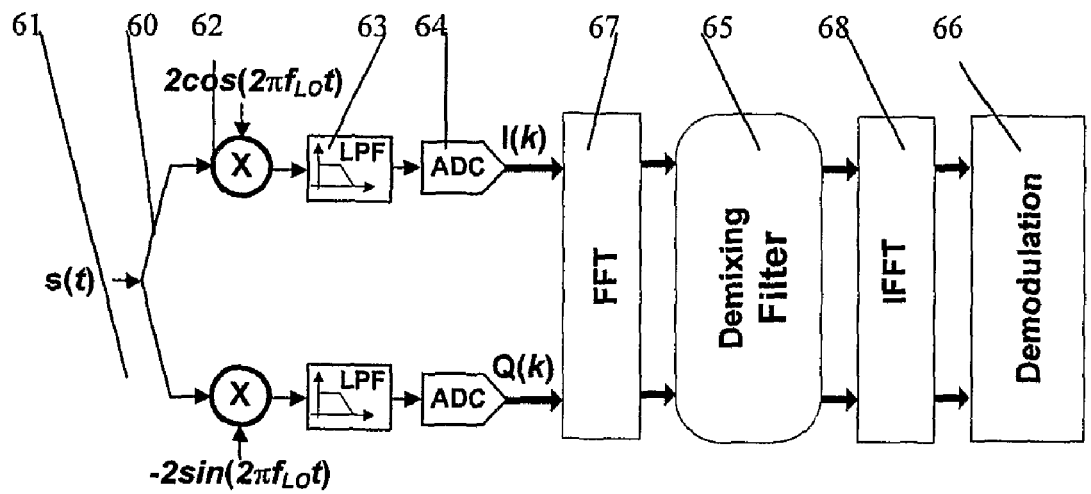
Figure 6(b) Proposed Frequency-domain Configuration
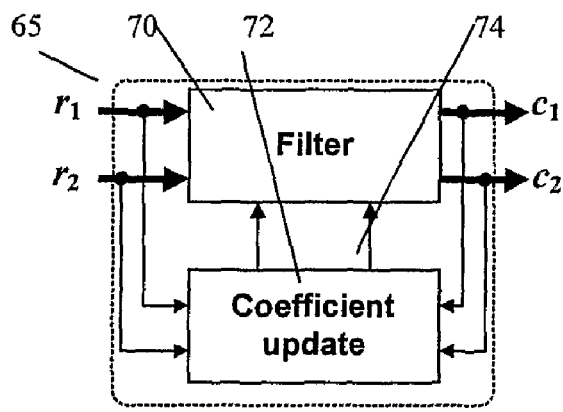
Figure 7: Demixing stage

SATELLITE RADIO NAVIGATION RECEIVER

FIELD OF INVENTION

The present invention relates to receivers for satellite radio navigation systems, commonly known as GNSS (Global Navigation Satellite Systems), including GPS, GLONASS and Galileo.

BACKGROUND OF THE INVENTION

The Global Positioning System (GPS) comprises 24 satellites in low earth orbit that continually broadcast their position and local time. Through satellite range measurements, a terrestrial (or airborne) receiver can determine its absolute position as long as four satellites are within view.

Galileo is Europe's initiative for a state-of-the-art Global Navigation Satellite System (GNSS), providing a highly accurate, guaranteed global positioning service. According to the European white paper "*European transport policy for 2010: time to decide*", GNSS is identified as a critical technology. Galileo shall be designed and developed using time, geodesy and signal structure standards interoperable and compatible with civil GPS and its augmentations. In the near to medium-term future the market for satellite navigation technology is expected to experience major growth.

Portable, consumer GNSS receivers require solutions that are compact, cheap and low-power e.g. have long battery life. To enable widespread proliferation of GNSS capabilities into consumer products, an integrated receiver should minimize the number of off-chip components. Integration of the entire receiver will minimize the part-to-part variation of discrete receivers. An integrated receiver will be easier to reproduce from product to product, since the precise layout of hundreds of components is not required. Furthermore, it is easier to manufacture and attain desired yield because the function of the entire receiver has been verified at the chip level. These considerations have lead to research into and deployment of new receiver architectures utilising low-IF or zero-IF (direct-conversion) approaches (IF: Intermediate Frequency). However, although providing high-level of integration and elimination of off-chip components these architectures suffer from IQ-phase and gain impairments, resulting in limited image-rejection that can be achieved. This is hindering their widespread economical use in commercial products.

The same problems are set to continue except more challenging with the significantly different modulation format Galileo has when compared to all previous GNSS systems. This is defined in the document "Status of Galileo Frequency and Signal Design (25.09.2002)", Guenter W. Hein, et al, http://europa.eu.int/comm/dgs/energy_transport/galileo/documents/technical_en .htm; as well as in working paper "GALILEO Signals: RF Characteristics (ICAO NSP/WGW: WP/36)—http://www.galileoju.com. Galileo includes three signal bands namely: E5, E6 and L1 with respective centre frequencies of 1191.795 MHz, 1278.750 MHz, and 1575.420 MHz. The E5 band contains two signals E5a and E5b. Galileo satellites will transmit signals in the E5a band (1176.450 MHz) and E5b band (1207.14 MHz) as a composite signal with a centre frequency of 1191.795 MHz. Modulation of the E5 will be Alternate Binary Offset Carrier (AltBOC). The generation of this signal is described in above two references. Referring to Appendix A of "Status of Galileo Frequency and Signal Design", a standard Binary Offset Carrier (BOC) modulation uses a rectangular subcarrier which can be a sine or a cosine of frequency fs, e.g. sign(sin($2\pi$fst)), to modulate a time domain signal s(t). This shifts the frequency of the signal to both upper sideband and corresponding lower sideband. BOC type signals are usually expressed in the form BOC(fs,fchip) where fs is the rectangular sub-carrier frequency and fchip is the spreading code chipping rate. Frequencies are indicated as multiples of 1.023 MHz. For example a BOC(10,5) signal has actually a sub-carrier frequency of 10×1.033 MHz=10.330 MHz and a spreading code chipping rate of 5×1.023 MHz=5.115 MHz. AltBOC on the other hand uses complex rectangular sub-carrier which is complex exponential given as sign($e^{j(2\pi fst)}$). Using the Euler formula this can be written as sign[cos($2\pi$fst)+j sin($2\pi$fst)]. In this way the signal spectrum is not split up, but only shifted to higher frequencies. Shifting to lower frequencies is also possible. The goal of the AltBOC modulation is to generate in a coherent manner the E5a and E5b bands which are respectively modulated by complex exponentials or sub-carriers, such that signals can be received as a wideband BOC-like signal. Constellation diagram for AltBOC modulated signals are given in FIG. 1.

The L1 signal consists of the multiplexing of three components that are L1P channel, L1F data channel and L1F pilot channel whereas the E6 signal consists of the multiplexing of E6p and E6c. These signals on the E6 and L1 bands use Coherent Adaptive Sub-carrier Modulation (CASM) which is also referred to as Interplex or Modified Tricode Hexaphase to generate the composite signals. This is defined in "Tricode Hexaphase Modulation for GPS", Proceedings of Institute of Navigation (ION)-GPS Annual Meeting, pages: 385-397, 1997 and in "L1 band part of Galileo Signal in Space ICD (SIS ICD)/also referred as: Galileo standardisation document for 3GPP"—http://www.galileoju.com. With this modulation format a QPSK signal resulting from the combination of two channels is phase modulated with the third channel. The modulation index m=0.6155 is used to set the relative power between the three channels. Constellation diagram for CASM/modified Hexaphase modulated signals are given in FIG. 2.

E5 is one of the most advanced and promising signals the Galileo satellites will transmit. Galileo receivers capable of tracking this signal will benefit from unequalled performance in terms of measurement accuracy, indoor performance and multipath suppression. However, the signal processing techniques required to process the AltBOC modulation are much more challenging than those for the traditional BPSK or even for the conventional BOC modulation. This stems from the extremely large bandwidth and from the complex interaction of the components in the spreading code.

As indicated above, Galileo receivers will suffer from IQ phase and gain impairments. Quadrature modulation and demodulation systems modulate data onto in-phase (I) and quadrature (Q) components of a baseband signal and then mix those baseband signals with I and Q components of a Radio Frequency (RF) carrier to broadcast the modulated data. The Q signal is ninety degrees out of phase with the I signal. In the receiver the reverse process is carried out, first receiving the broadcast signal, then downconverting to recover the I and Q components of the modulated baseband signal, and then recovering the data from those I and Q components.

Receiver architectures that utilize IQ-signal processing are vulnerable to mismatches between the I and Q channels. This can happen at several stages in the receiver; the RF splitter used to divide the incoming RF signal equally between the I and Q paths may introduce phase and gain differences. The differences in the length of the two RF paths can result in phase imbalance. The quadrature 90° phase-splitter used to generate the I and Q Local-Oscillator (LO) signals that drive the I and Q channel mixers may not be exactly 90°. Furthermore, there might be differences in conversion losses between the output ports of the I and Q channel mixers. In addition to these, filters and Analog-to-Digital-Converters (ADCs) in the I and Q paths are not perfectly matched. The effects of these impairments on the receiver's performance can be detrimental. The IQ-imbalances can be characterized by two parameters: the amplitude mismatch, $\alpha_\epsilon$ and the phase orthogonality mismatch, $\phi_\epsilon$ between the I and Q branches. The amplitude-imbalance, $\beta$ in decibels is obtained from the amplitude mismatch $\alpha_\epsilon$ as:

$$\beta=20\log_{10}[1+0.5\alpha_\epsilon/1-0.5\alpha_\epsilon] \quad (1)$$

The Quadrature Demodulator receiver model of FIG. 3 incorporates IQ-imbalances as impaired LO signals. An input signal s(t) is mixed with a local oscillator signal $f_{LO}$ in quadrature channels. The mixed signal is subject in each channel to gain and Low Pass Filtering (LPF).

FIG. 4 demonstrates the effects of varying the IQ phase and gain mismatches on the raw Bit-Error-Rate (BER) performances of the systems using (a) 32-PSK and (b) 256-QAM modulation formats. As can be observed the IQ-imbalances degrade the system's BER performance greatly. This degradation in performance is not desirable and must be compensated. In order to ensure correct symbol detection RF impairments must be compensated for before the symbol decision takes place.

In the papers "Adaptive Compensation of Analog Front-End I/Q Mismatches in Digital Receivers", Cetin E., Kale I., Morling R. C. S., *IEEE International Symposium on Circuits and Systems*, (ISCAS 2001), vol. 4, pp. 370-373, May 2001., "Adaptive Self-Calibrating Image Rejection Receiver", Cetin E., Kale I., Morling R. C. S., *IEEE International Conference on Communications* (ICC 2004), vol. 5, pp. 2731-2735, June 2004. , "On the structure, convergence and performance of an adaptive I/Q mismatch corrector" by: Cetin, E.; Kale, I.; Morling, R. C. S., *IEEE Vehicular Technology Conference* (VTC 2002 Fall), vol. 4, pp. 2288-2292, September 2002, there is discussed single ended zero-IF and Low-IF I/Q channel wireless systems. The papers propose a blind (unsupervised) technique that does not require pilot tones, but instead employs a blind adaptive algorithm. It is recognized that mismatch errors create cross-correlation between the I and Q channels in the case of zero-IF approach or the desired and the adjacent/interfering channel in the case of low-IF approach. In order to remove the cross-correlation, adaptive filters are cross-coupled between the I and Q channels. The coefficients of the filters are updated by the adaptive algorithm chosen. The signals that were subject of these papers were relatively simple to process as compared with the highly complex wideband schemes of Galileo, as explained above.

SUMMARY OF THE INVENTION

It is an object of this invention to provide a means to reduce RF impairments in satellite radio navigation receivers, arising from mismatches between I and Q channels.

It is a further object of the invention to provide a satellite radio navigation receiver which can be highly integrated and which is economical to build and run i.e. simpler, cheaper and lower power.

In a first aspect, the invention provides a method of removing I/Q-mismatches in a received navigation signal of a satellite radio navigation system, the method comprising:

resolving the received navigation signal into I and Q signal components, and providing said I and Q signal components as inputs to a demixing stage which demixes said I and Q signal components from unwanted signals, the demixing stage including first and second adaptive filters, whose coefficients are updated by the outputs of the demixing stage, the outputs of the demixing stage representing an IQ mismatch corrected signal.

In a second aspect, the invention provides a satellite radio navigation receiver, the receiver being adapted to remove I/Q-mismatches in a received navigation signal and comprising:

resolving means for resolving the received navigation signal into I and Q signal components, and a demixing stage arranged to receive as input signals said signal components for demixing said signal components from unwanted signals, the demixing stage including first and second adaptive filters, and means for updating the coefficients of said adaptive filters by the outputs of the demixing stage, the outputs of the demixing stage representing IQ-mismatch corrected signals.

In accordance with the invention, said demixing stage demixes or separates unwanted signals in I and Q signal components, which may be complex conjugate components in the case of a zero IF receiver, or an interfering signal at a mirror image frequency in the case of a low IF receiver, as will be explained below. In either case, the output of the demixing stage represents an IQ-mismatch corrected received signal.

The present invention proposes the use of unsupervised algorithms to deal with analog front-end impairments in global satellite navigation systems. In the presence of IQ errors I and Q channels in the case of the zero-IF approach or the desired and the adjacent/interfering channel in the case of low-IF approach are correlated. With the invention the only assumption is that in the absence of IQ impairments I and Q channels or desired and adjacent/interfering channel are not correlated.

As preferred the present invention is applied to Galileo modulation schemes, in particular the AltBOC scheme of the E5 signal and CASM/modified Hexaphase scheme of the L1 and E6 signals. The present invention processes these complex modulation schemes, which may have different signals on upper and lower sidebands, but wherein the whole bandwidth, which may be very wide, has to be processed through the same RF chain, with very high sampling rates and clock frequencies.

In accordance with the invention, unsupervised digital-signal-processing-based compensation schemes can either be deployed in the time or frequency domains or a mixture of the two to combat these undesirable impairments. Use of this technique will allow complexity in analog circuitry and associated costs to be reduced at the expense of additional (increased) digital signal processing, yielding an overall economic system solution. Application of these unsupervised signal processing techniques will eliminate to a very high extent the need for discrete off-chip components resulting in simpler, lower cost and low power receivers with enhanced performance. These will subsequently manifest themselves in simpler RF front-ends and relaxed ADC analog circuit requirements and resulting in a major step towards low-power single-chip global satellite navigation receivers.

Analog front-end impairments greatly limit the performance of zero-IF and low-IF transceivers. An effective and practically realizable low-power digital unsupervised compensation structure is proposed based on two digital filters to alleviate the performance degradation. The digital compensation structure and adaptive coefficient update algorithm for determining the digital compensation filter coefficients have been developed.

Whilst the invention is applicable to GNSS receivers in general, it may also be applied to mobile phones having a radio navigation facility, for example Galileo, GPS, GSM, CDMA, a type of hybrid handheld devices which is set to be a standard in the future. Since the processing takes place in the digital domain use is made of the configurability of the digital-signal-processing to handle other signals in an integrated hybrid system including and not limited to GPS, GSM, UMTS and WiFi applications.

BRIEF DESCRIPTION OF THE DRAWINGS

Preferred embodiments of the invention will now be described with reference to the accompanying drawings wherein:

FIG. 1 shows diagrammatically AltBOC modulation used in the Galileo system;

FIG. 2 shows diagrammatically modified hexaphase modulation used in the Galileo system;

FIG. 3 is a schematic view of a prior art Quadrature Demodulator;

FIG. 4 shows the effects of IQ-imbalances on BER of (a) 32-PSK and (b) 256-QAM modulated signals;

FIG. 5 shows schematic block diagrams of receivers using zero or low IF for the Galileo system;

FIGS. 6(a) and 6(b) are block diagrams of preferred embodiments in the time domain and in the frequency domain of receivers for the Galileo system, in accordance with the invention;

FIG. 7 shows in more detail, a preferred configuration for removing IQ-mismatch in accordance with the invention;

DESCRIPTION OF PREFERRED EMBODIMENTS

Figure 8:
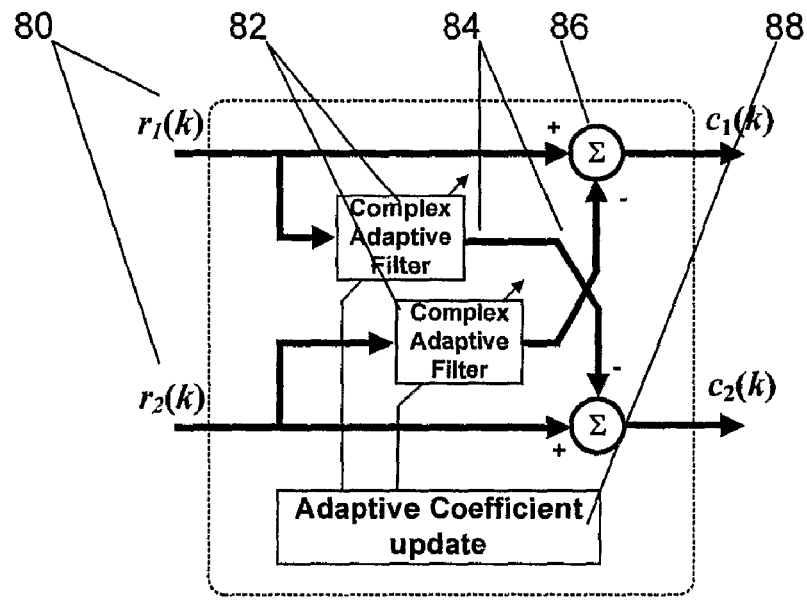
FIG. 8 is a schematic circuit diagram of a preferred de-mixing unit according to the invention for removing IQ mismatch between I and Q channels.

In the Galileo system, the modulation formats proposed are AltBOC and CASM/modified Hexaphase modulation scheme for E5, E6 and L1 signals respectively. Using the CASM/modified Hexaphase modulation, the L1 signal can be written as:

$$s_{L1}(t) = [C_{L1}^a(t) \cdot D_{L1}^a(t) \cdot U_{L1}^a \cdot \cos(m) - C_{L1}^c(t) \cdot U_{L1}^{b,c} \cdot \sin(m)] \cdot \quad (2)$$
$$\cos(2\pi f_{L1} t) - [C_{L1}^b(t) \cdot D_{L1}^b(t) \cdot U_{L1}^{b,c} \cdot \cos(m) +$$
$$C_{L1}^a(t) \cdot D_{L1}^a(t) \cdot U_{L1}^a \cdot C_{L1}^b(t) \cdot D_{L1}^b(t) \cdot C_{L1}^c(t) \cdot \sin(m)]\sin(2\pi f_{L1} t)$$

where:
- $C_X^Y(t)$ is the ranging code on the Y channel ("Y" stands for I or Q for two channels signals, or A, B or C for three channels signals) of the X carrier frequency ("X" stands for E5a, E5b, E6 or L1).
- $D_X^Y(t)$ is the data signal on the Y channel in the X frequency band.
- $f_X$, is the carrier frequency in the X frequency band.
- $U_X^Y(t)$ is the rectangular subcarrier on the Y channel in the X frequency band.
- m is a modulation index, associated to the CASM/modified Hexaphase modulation.

FIG. 2 shows the constellation diagram, the number of phases is equal to six, hence the name hexaphase.

Block diagrams of possible highly integrated GNSS receivers utilising low-IF and zero-IF topologies are shown respectively in FIGS. 5(a) and (b). The architecture in both Figures corresponds generally to that shown in FIG. 3, but with the addition of Analog to Digital Converters (ADC) in the I and Q channels. In the Low-IF case of FIG. 5(a), the mixing local oscillator signal is $f_{LO}=f_{RF}-f_{IF}$. In the Zero-IF case of FIG. 5(b), the mixing local oscillator signal is $f_{LO}=f_{RF}$. Each figure shows diagrammatically the form of the input signal to the left of the figure, and the likely form of the recovered signal incorporating RF-impairments as it appears at the end of the receive chain, at the bottom of the figure.

As can be observed from FIGS. 5(a) and (b), RF impairments result in: (a) adjacent channel contaminating the desired channel, (b) complex-conjugate of the desired channel contaminating the desired channel. In both cases the receiver's performance will always be limited by the linearity performance of the quadrature mixer. These disadvantages of these techniques have prevented their wide-spread use in commercial and military applications.

In the low-IF case, the incoming signal, s(t), consists of the wanted signal u(t) at $f_{RF}$ and unwanted interfering signal i(t) at $f_{IMG}$ where $f_{IMG}=f_{RF}-2f_{IF}$. Hence, the incoming signal s(t) can be expressed as:

$$s(t) = \Re\{u(t)e^{j2\pi f_{RF} t}\} + \Re\{i(t)e^{j2\pi f_{IMG} t}\} \quad (3)$$

where u(t) and i(t) are the complex envelopes of the wanted and interfering signals respectively, and $\Re$ is the real part of u and i. Incorporating the RF impairments, the resulting IF signal can be expressed as:

$$r_{IF}(t) = \frac{1}{2}\left[u(t)\left(g_1 e^{-j\frac{\varphi_\epsilon}{2}} + g_2 e^{j\frac{\varphi_\epsilon}{2}}\right)e^{j2\pi f_{IF} t} + \right. \quad (4)$$
$$\left. u^*(t)\left(g_1 e^{j\frac{\varphi_\epsilon}{2}} - g_2 e^{-j\frac{\varphi_\epsilon}{2}}\right)e^{-j2\pi f_{IF} t}\right] + \frac{1}{2}\left[\right.$$
$$\left. i^*(t)\left(g_1 e^{j\frac{\varphi_\epsilon}{2}} - g_2 e^{-j\frac{\varphi_\epsilon}{2}}\right)e^{j2\pi f_{IF} t} + i(t)\left(g_1 e^{-j\frac{\varphi_\epsilon}{2}} + g_2 e^{j\frac{\varphi_\epsilon}{2}}\right)e^{-j2\pi f_{IF} t}\right]$$

where $g_1=(1+0.5\alpha_\epsilon)$, $g_2=(1-0.5\alpha_\epsilon)$ (see equation 1) and $(\bullet)^*$ is the complex conjugate. As can be observed, the desired signal u(t) is corrupted by the image i*(t) leaked in-band due to analog mismatches. There is also a leakage from the desired signal into the image channel. A frequency domain illustration, of this is given FIG. 5(a) In a fully balanced system; however, the wanted signal and the interferer are downconverted to opposite frequencies $+f_{IF}$ and $-f_{IF}$. Signals I and Q are then converted into the digital domain. Following this, another mixer stage takes care of the final downconversion from IF to baseband. As this conversion stage takes place in the digital domain, the I and Q channels are matched hence, ideal mixing is assumed leading to the following baseband signal:

$$r_{BB}(k) = u(t)\overbrace{\left(g_1 e^{-j\frac{\varphi_\epsilon}{2}} + g_2 e^{j\frac{\varphi_\epsilon}{2}}\right)}^{h_1} + i^*(t)\overbrace{\left(g_1 e^{j\frac{\varphi_\epsilon}{2}} - g_2 e^{-j\frac{\varphi_\epsilon}{2}}\right)}^{h_2} \quad (5)$$

where $h_1, h_2$ have the values indicated by horizontal brackets. $h_1, h_2$ may be regarded as the elements of a mixing matrix H.

As can be observed the final baseband signal not only contains the scaled version of the desired signal but also a scaled version of the interfering signal. The Image-Rejection Ratio (IRR) is defined as the ratio between the desired signal to the interfering signal power.

In the case of a zero-IF receiver, as shown in FIG. 5(b), the baseband signal $r_{BB}$ is given as:

$$r_{BB}(k) = g_1[u_I(k)\cos(\varphi_\varepsilon/2) + u_Q(k)\sin(\varphi_\varepsilon/2)] + \qquad (6)$$
$$jg_2[u_I(k)\sin(\varphi_\varepsilon/2) + u_Q(k)\cos(\varphi_\varepsilon/2)]$$
$$= \frac{1}{2}\left[\underbrace{\left(2\cos\frac{\varphi_\varepsilon}{2} - j\alpha_\varepsilon\sin\frac{\varphi_\varepsilon}{2}\right)u(t)}_{h_1} + \underbrace{\left(\alpha_\varepsilon\cos\frac{\varphi_\varepsilon}{2} + j2\sin\frac{\varphi_\varepsilon}{2}\right)u^*(t)}_{h_2}\right]$$

where $g_1=(1+0.5\alpha_\varepsilon)$, $g_2=(1-0.5\alpha_\varepsilon)$ and $(\bullet)^*$ is the complex conjugate, and $h_1, h_2$ may be regarded as the elements of a mixing matrix H. As can be seen cross-talk exists between the I and Q channels.

FIGS. 6(a) and 6(b) show diagrammatically Galileo receivers according to preferred embodiments of the invention for eliminating RF-impairments, FIG. 6(a) being a time-domain configuration, and FIG. 6(b) being a frequency-domain configuration In both figures, an input signal s(t) is fed to I and Q channels 60, 61. Each channel contains a mixer 62 for mixing the input signal with a local oscillator signal $f_{LO}$ to give a zero-IF signal, or a low-IF signal, as required. The down-converted signal is applied to a low pass filter 63, and the filtered signal is digitised in an ADC 64. In the case of the time domain embodiment, the digitised signal is applied to a demixing stage 65, and the resulting signal, having RF impairments corrected, is subject to demodulation to recover the navigation signals in a demodulator 66. In case of the frequency domain embodiment, an incoming time domain signal is digitised and is then subject to a Fast Fourier Transform as at 67, before being applied to demixing stage 65. The demixed signal is subject to an Inverse FFT as at 68 before being applied to demodulator 66. Alternatively the demixed signal may be processed in the frequency domain in demodulator 66, and IFFT 68 may be dispensed with. In addition, FFT 67 may be replaced by a simpler means of time/frequency transformation, as the number of points in question are small.

In the low-IF case, the demixing stage 65 acts as a 2-by-2 blind-complex-source separator with u(t) and i(t) being the sources and tries to estimate them from observed signals. For this approach to work not only the $+f_{IF}$ but also the $-f_{IF}$ portion needs to be downconverted to the baseband. In the zero-IF case, preferred embodiment acts as a 2-by-2 blind-source separator operating on I and Q signals.

FIG. 7 depicts the demixing stage 65 of FIG. 6 in more detail. It consists of an adaptive filter block 70 having inputs $r_{1,2}$ and outputs $c_{1,2}$. A coefficient update block 72 receives signals r, c and provides coefficient update signals 74 25 to filter block 70. The demixing stage of FIG. 7, and as shown in more detail in FIGS. 8 and 9, is applicable both to the time domain and frequency domain arrangements of FIG. 6.

Depending on the receiver topology used i.e. low-IF or zero-IF, signals $r_1$, $r_2$, $c_1$, and $c_2$ can be complex or real respectively. Furthermore, choice of topology 30 also affects the filter and the adaptive filter update blocks. They can either be complex or real for low-IF and zero-IF topologies respectively. Furthermore, since the GPS data is ±1 the hardware overhead due to the preferred embodiment is minimal.

The preferred embodiment can be simply integrated into signal processing chains of an existing receiver as an IP core or as a software code.

Figure 9:
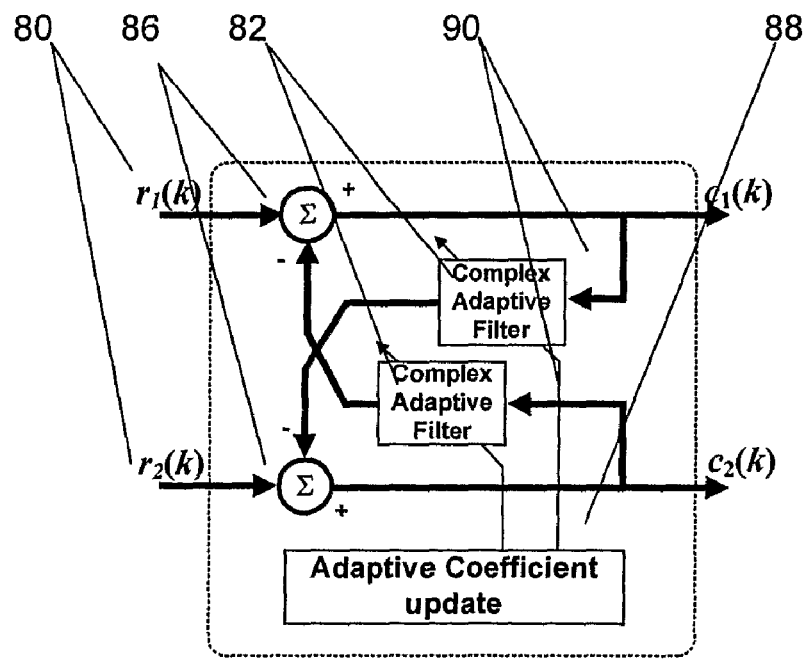
FIG. 9 is a schematic circuit diagram of an alternative de-mixing unit according to the invention for removing IQ mismatch between I and Q channels.

FIG. 8 shows a preferred implementation of a demixing unit, comprising cross-coupled filters for resolving IQ-mismatch. FIG. 8 shows in detail the manner in which the adaptive filter system uses both $r_1$ and $r_2$, to generate the corrected signals. In the case of zero-IF $r_1$ and $r_2$ are I and Q signals respectively; whereas in the low-IF case $r_1$ and $r_2$ are desired $(+f_{IF})$ and image signals $(-f_{IF})$ respectively, downconverted to the baseband in the digital domain. The adaptive system includes cross-coupled adaptive filters. The received signal $r_1$ and $r_2$ are fed into cross-coupled adaptive filters. The adaptive coefficient update block determines a new de-correlation-matrix or demixing matrix W that, when used to generate another corrected signal, further reduces the magnitude of the error signal, i.e. the demixing matrix W functions to compensate for, or cancel, the mixing matrix H (see equation 5). The output of the coefficient update block is then provided back to the adaptive-filter system which then replaces its demixing matrix as provided by the coefficient-update block. This new demixing matrix is then used to perform inverse filtering, these estimates are then subtracted to yield the estimated or reconstructed signals $c_1(k)$ and $c_2(k)$, where k replaces t as the discrete time sample. The process continues until the magnitude of the error signal reaches a minimum or a pre-defined threshold. The error signal thus functions as a feed-back signal for adjusting the demixing matrix.

As shown in FIG. 8, the I and Q components of the carrier, $r_1, r_2$ are applied to the inputs of a demixing unit 80. Demixing unit 80 comprises first and second adaptive filters 82 in feed forward loops 84. Loops 84 are cross-coupled between the two channels, and are connected to summation points 86 in the channels, so that each input signal, as modified by the adaptive filter, is added to the other input signal. The outputs of the channels, $c_1(k)$, $c_2(k)$ represent the outputs of the demixing unit, and are used to update the coefficients of the filters, as at 88.

When the error signal is removed, the demixing matrix W cancels the mixing matrix H. A more rigorous mathematical treatment of this problem may be found in the above cited papers to Cetin E., et al. For the feed-forward case, it may be shown from the above that the source estimates, $c_1(k)$ and $c_2(k)$, become:

$$c_1(k)=(1-w_1h_2)r_1(k)+(h_1-w_1)r_2(k)$$
$$c_2(k)=(h_1-w_2)r_1(k)+(1+w_2h_1)r_2(k) \qquad (8)$$

When the filters converge, i.e. $w_1=h_1$ and $w_2=h_2$ then the source estimates become:

$$c_1(k)=(1-h_1h_2)r_1(k)$$
$$c_2(k)=(1-h_1h_2)r_2(k) \qquad (9)$$

For the feed-back case:

$$c_1(k) = \frac{1}{1-w_1w_2}[(1-w_1h_2)r_1(k) + (h_1-w_1)r_2(k)] \qquad (10)$$

$$c_2(k) = \frac{1}{1-w_1w_2}[(h_2-w_2)r_1(k) + (1-w_2h_1)r_2(k)]$$

When the filters converge, i.e. $w_1=h_1$ and $w_2=h_2$ then the source estimates become:

$$c_1(k)=r_1(k)$$
$$c_2(k)=r_2(k) \qquad (11)$$

An alternative implementation for the demixing unit is placing the filters in the feedback loop. The structure is shown in FIG. 9, where similar parts to those of FIG. 8 are denoted by the same reference numeral. Filters 82 are placed in feedback loops 90.

The filter coefficients can be calculated by means of an adaptive algorithm. This can be the simple standard Least-Mean-Square (LMS) or Recursive Least Squares (RLS) algorithm. Of course the choice of adaptive algorithm will affect the performance; however, the proposed approach is independent of any specialist algorithm or requirement for any specifically tailored algorithm/scheme for updating its filter coefficients.

We have demonstrated that the coefficient update works by using only the polarity of the output signal, with the overall system performance not compromised in any way; this results in massively reduced complexity. Furthermore, the operation of the adaptive filter will also be simplified as we will be operating using the sign of the derived coefficients.

In order to derive navigation data, which is bipolar, ±1, from the outputs of the demixing stage in demodulator 66, a very simple or trivial ADC operation is required, which may at its simplest employ a polarity detector or hard limiter. Features of the invention, at least in the embodiments described above are as follows:

1—Method that eliminates RF impairments in global satellite navigation systems receivers without the need for pilot/test tones.
2—An alternative implementation for the separation structure is found by placing the filters in the feedback loop.
3—Enhanced performance devices with reduced bill of material costs, which enables electronics manufacturers to cost-effectively design and market cheaper products.
4—Integration and elimination of large, power hungry analog components through relaxed RF front-end specifications that are compensated and aided by our novel digital processing techniques leads to more robust and power efficient products designed using non-specialist low-production-cost CMOS technology.
5—Method is applicable both to zero-IF and low-IF receivers.
6—Method applicable for both time and frequency domain correction.
7—Method for correction matrix estimation using the polarity of the data only rendering extremely hardware efficient solution. We have demonstrated that this coefficient update block works with just polarity information with the overall system not compromised resulting in massively reduced complexity.
8—Blind hence no need for training or pilot/test tones.
9—The approach works very well with AltBOC and Hexaphase/CASM
10—Easily integrated into standard signal-processing chains of receivers with little hardware/software overhead. The invention can be easily applied to existing systems, without requiring changes to installed infrastructure.
11—Operates under multi-path, fading environments as well as in low-SNR cases making it suitable for weak-signal GPS applications.
12—Both channels are recovered to high quality. With the low-IF version, one not only recovers the desired channel but also the interferer which happens to be the adjacent channel.

The invention claimed is:

1. A satellite radio receiver, the receiver being adapted to remove I/Q mismatches in a received navigation signal and comprising:
resolving means for resolving the received navigation signal into I and Q signal components, and a demixing stage arranged to receive as input signals said signal components for demixing said signal components from unwanted signals, wherein said demixing stage comprises a first input coupled through a first signal path that includes first subtraction means to a first output, a second input coupled through a second signal path that includes second subtraction means to a second output, a first adaptive filter being coupled from said first signal path to said second signal path, and a second adaptive filter being coupled from said second to said first signal path,
and means for updating the coefficients of said adaptive filters by the outputs of the demixing stage, the outputs of the demixing stage representing IQ-mismatch corrected signals.

2. A receiver according to claim 1, wherein said first filter is coupled between said first input and said second subtraction means in a feed forward loop, and said second filter is coupled between said second input and said first subtraction means in a feed forward loop.

3. A receiver according to claim 1, wherein said first filter is coupled between said first output and said second subtraction means in a feedback loop, and said second filter is coupled between said second output and said first subtraction means in a feedback loop.

4. A receiver according to claim 1, wherein the coefficients of the adaptive filters comprise the sign of the outputs of the demixing stage.

5. A receiver according to claim 1, including time/ frequency transform means coupled to the inputs of the demixing stage, for carrying out the demixing on a signal in the frequency domain.

6. A receiver according to claim 1, wherein the receiver is a zero- IF receiver, and said resolving means includes zero-IF mixing means.

7. A receiver according to claim 6 wherein the receiver is a low- IF receiver, and said resolving means includes low-IF mixing means to convert the received navigation signal to low-IF signals, and including further mixing means for converting said low IF-signals to baseband to provide said I and Q components.

* * * * *